(12) United States Patent
Yu

(10) Patent No.: US 7,665,904 B2
(45) Date of Patent: Feb. 23, 2010

(54) OPTICAL TRANSCEIVER

(75) Inventor: Juhyun Yu, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/141,700

(22) Filed: Jun. 18, 2008

(65) Prior Publication Data

US 2008/0314099 A1 Dec. 25, 2008

(30) Foreign Application Priority Data

Jun. 20, 2007 (JP) ............... 2007-162434
Mar. 27, 2008 (JP) ............... 2008-082410

(51) Int. Cl.
*G02B 6/36* (2006.01)
*G02B 6/40* (2006.01)
*G02B 6/38* (2006.01)
*G02B 6/00* (2006.01)
*H04B 10/02* (2006.01)
*H04B 10/00* (2006.01)

(52) U.S. Cl. .................. 385/88; 385/53; 385/54; 385/55; 385/75; 385/76; 385/77; 385/89; 385/92; 385/93; 385/94; 385/135; 385/136; 385/137; 385/138; 385/139; 398/134; 398/135; 398/136; 398/137; 398/138; 398/139

(58) Field of Classification Search ............ 385/53–55, 385/75–77, 88, 89, 92–94, 135–139; 398/134–139
See application file for complete search history.

(56) References Cited

U.S. PATENT DOCUMENTS 6,929,403 B1 * 8/2005 Arciniegas et al. ............ 385/55

2004/0101257 A1 * 5/2004 Kruger et al. ............. 385/92
2004/0161958 A1 * 8/2004 Togami et al. ............ 439/160
2004/0228582 A1   11/2004 Yamada et al.
2006/0078259 A1 * 4/2006 Fuchs ..................... 385/88

FOREIGN PATENT DOCUMENTS

JP   A-H06-170979   6/1994
JP   A 2004-343506   12/2004

* cited by examiner

*Primary Examiner*—Brian M. Healy
*Assistant Examiner*—Hung Lam
(74) *Attorney, Agent, or Firm*—Scully, Scott, Murphy & Presser, P.C.

(57) ABSTRACT

An optical transceiver includes a housing formed to be inserted into or extracted from a cage in a host device, a movable lock member for preventing the housing from being extracted from the cage, where the cage includes a lock hole for preventing the housing from being extracted from the cage when the movable lock member is placed into the lock hole, and an integration parts. The integration parts includes an actuator portion engaged with the movable lock member rotatably connected to a rotation shaft attached to the housing, arranged movably in a front/back direction thereof in the housing, arranged to place the movable lock member into the lock hole when moved backward, and arranged to release the movable lock member from the lock hole when moved forward, and a rotating lever portion connected to the actuator portion through a hinge portion, arranged rotatably from an upper front end of the housing to a forward position along with development of the hinge portion, and including a handle for moving the actuator portion to the forward position when rotated forward. The actuator portion and the rotating lever portion of the integration parts are integrally formed.

6 Claims, 6 Drawing Sheets

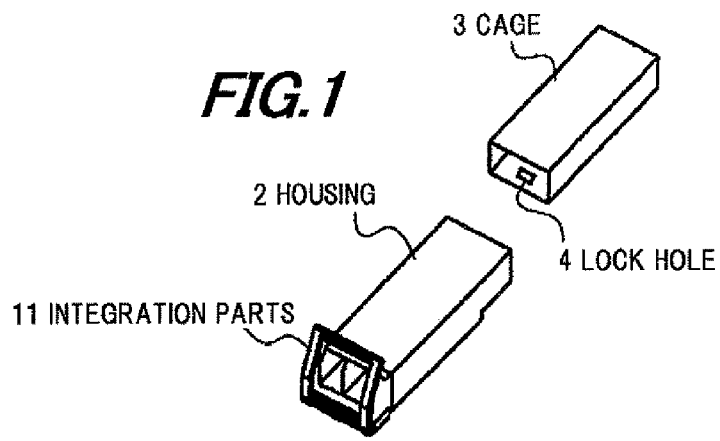
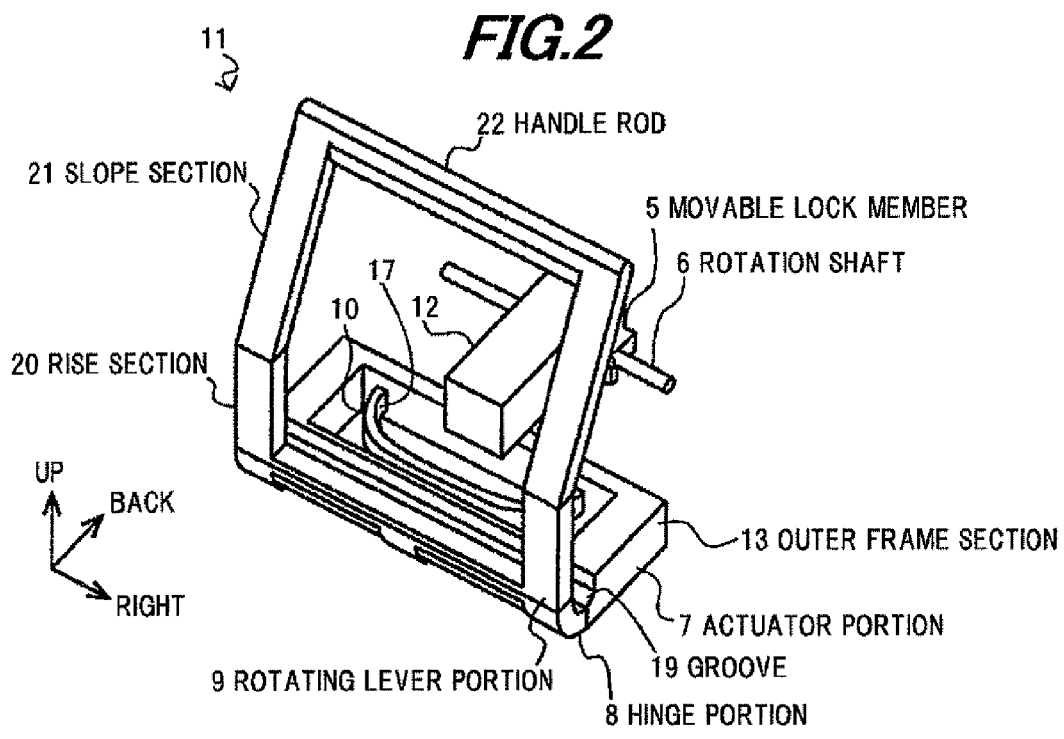

51 HINGE PORTION
52 GROOVE

61 L-SHAPED ROD

63 L-SHAPED ROD
62 GROOVE

71 L-SHAPED ROD
72 ROUND GROOVE
73 THIN PART

74 L-SHAPED ROD
76 GROOVE
75 ROUND CONVEX PORTION

OPTICAL TRANSCEIVER

The present application is based on Japanese patent application Nos. 2007-162434 and 2008-082410 filed on Jun. 20, 2007 and Mar. 27, 2008, respectively, the entire contents of which are incorporated herein by reference.

BACKGROUND OF THE INVENTION

1. Field of the Invention

The invention relates to an optical transceiver with a lock mechanism.

2. Description of the Related Art

An optical transceiver is disposed between an optical fiber as a transmission line and an optical communication device as an optical electronic equipment, and detachably attached to the optical communication device (host device). The optical communication device has a slot called "cage", where a housing of the optical transceiver is housed in the cage.

The housing houses optical parts and electrical parts for optical communication. The optical parts are built in at the front end of the housing, and arranged to be optically connected to an optical fiber to be inserted. An electrical terminal is formed at the rear end of the housing to be connected electrically to an internal circuit of the optical communication device.

The optical transceiver has a lock mechanism so as not to cause an unnecessary detachment. For instance, the housing is provided with a movable lock member formed movably in the insertion/extraction direction of the movable lock member inside the housing, and the cage is provided with a lock hole. When the movable lock member is move in the insertion direction with respect to the housing, the movable lock member is put into the lock hole of the cage to allow the locking of the housing to the cage, where the optical transceiver is fixed to the optical communication device. In contrast, when the movable lock member is moved in the extraction direction with respect to the housing, the movable lock member is released from the lock hole to detach the housing from the cage so that the optical transceiver can be removed from the optical communication device.

FIG. 9 shows the appearance of a conventional optical transceiver 91. In the optical receiver 91, a housing 92 can be inserted at its rear portion into a cage 3, and is provided with a lock mechanism 93 at a front end of the housing 92.

As shown in FIG. 10, the conventional optical transceiver needs, as parts for constructing the lock mechanism 93, a movable lock member 95 rotatable around a rotation shaft 94, an actuator 96, two rotating levers 97, a pin 98 for the rotating lever (hereinafter also referred to as "rotating lever pin"), two coil springs 99, and an identification color attachment 100.

The actuator 96 serves to put the movable lock member 95 into a lock hole 4 provided in the cage 3 or to remove it therefrom, and the actuator 96 is formed movably in the front/back direction in the housing 92.

Furthermore, a central bar section 101 connected to the actuator 96 has a protrusion 102 engaged with the movable lock member 95 (see FIGS. 11 and 12), and a step portion 103 secured to the housing 92 and functioning as a stopper after the protrusion 102 climbs over the rotation shaft 94 with the movable lock member 95 rotatably attached thereto (see also FIGS. 11 and 12).

FIG. 11 shows a state that the housing 92 is engaged with the cage 3 when the actuator 96 is moved backward. In this state where the protrusion 102 climbs over the rotation shaft 94 and the step portion 103 is placed against the rotation shaft 94, the protrusion 102 pushes the movable lock member 95 such that the movable lock member 95 is inserted in the cage 3 and hits against a cage 3a (which is indicated as a part of the cage 3 in FIGS. 11 and 12). Then, the cage 3a is pressed and expanded downward by the movable lock member 95 and the movable lock member 95 is thereby put into the lock hole 4 formed in the cage 3, so that the hosing 92 is engaged with the cage 3 and restricted in insertion/extraction thereof.

FIG. 12 shows a state that the housing 92 is released from the cage 3 when the actuator 96 is moved forward. In this state where the protrusion 102 is moved forward to a position where the protrusion 102 does not climb over the rotation shaft 94, the movable lock member 95 is made rotatable and the movable lock member 95 is rotated by being pulled by the housing 92 to a position where the movable lock member 95 is aligned with the rotation shaft 94. Thus, the movable lock member 95 is released from the lock hole 4 formed in the cage 3, where the housing 92 can be extracted from the cage 3.

The actuator 96 is formed by metal molding and formed of a metallic or plastic material.

The rotating lever 97 is coupled to the actuator 96 via the rotating lever pin 98 and the rotating levers 97 are axis-rotatable around the rotating lever pin 98 from a upper front end portion of the housing 92 to a forward position of the lock mechanism 93. The rotating levers 97 function as a handle for moving the actuator 96 in the front direction of the lock mechanism 93 when being rotated forward. When the actuator 96 is moved backward and the housing 92 is engaged with the cage 3, the rotating levers 97 are arranged at the upper front end portion of the housing 92 so as not to make unnecessary protrusion thereat. Thus, this arrangement does not interfere with the insertion/extraction of an optical fiber at the front end of the housing 92. The rotating levers 97 are formed of a metal, and formed by folding a metallic plate. The rotating lever pin 98 is formed of a metal rod material.

The coil springs 99 are energized when the actuator 96 is moved forward, and de-energized to move the actuator 96 backward. The coil springs 99 are placed between a part of the housing 92 and the actuator 96.

The identification color attachment 100 is a sign for identifying visually the type or specification of an optical transceiver according to its color. The identification color attachment 100 is disposed on the front surface of the rotating levers 97 when the housing 92 is engaged. The reason for providing the identification color attachment 100 is that the rotating levers 97 are formed of the metal and therefore difficult to be colored. The identification color attachment 100 is attached to the rotating levers 97 by using adhesives etc.

The related arts of the invention are, for example, JP-A-2004-343506, and JP-A-H06-170979.

The conventional optical transceiver includes many components for composing the lock mechanism. Namely, the lock mechanism requires the movable lock member 95, the actuator 96, the rotating levers 97, the rotating lever pin 98, the coil springs 99, the identification color attachment 100 and the like.

Furthermore, the conventional optical transceiver has the complicated construction that the components are engaged with each other, placed against each another, or combined with each other. In addition, the mechanistic factors for assembling the components are complicated, and it takes long time for assembling them.

Therefore, the costs (i.e., parts cost and assembly cost) for the conventional optical transceiver become expensive.

SUMMARY OF THE INVENTION

It is an object of the invention to provide an optical transceiver with a lock mechanism that allows simplification in parts or components.

(1) According to one embodiment of the invention, an optical transceiver comprises:

a housing formed to be inserted into or extracted from a cage in a host device;

a movable lock member for preventing the housing from being extracted from the cage, the cage comprising a lock hole for preventing the housing from being extracted from the cage when the movable lock member is placed into the lock hole; and an integration parts comprising:

an actuator portion engaged with the movable lock member rotatably connected to a rotation shaft attached to the housing, arranged movably in a front/back direction thereof in the housing, arranged to place the movable lock member into the lock hole when moved backward, and arranged to release the movable lock member from the lock hole when moved forward; and a rotating lever portion connected to the actuator portion through a hinge portion, arranged rotatably from an upper front end of the housing to a forward position along with development of the hinge portion, and comprising a handle for moving the actuator portion to the forward position when rotated forward, wherein the actuator portion and the rotating lever portion of the integration parts are integrally formed.

In the above embodiment (1), the following modifications and changes can be made.

(i) The integration parts further comprises a spring portion that is connected to the actuator portion, energized when the actuator portion is moved forward, and moves the actuator portion backward when the spring portion is de-energized.

(ii) The spring portion comprises a leaf spring comprising a rising shape that is formed opposite to a stopper portion formed on the housing, the rising shape comprising a base portion where it is connected to the actuator portion and a contact portion where it is pressed against the stopper portion.

(iii) The integration parts comprises a resin molded product.

(iv) The hinge portion comprises a thin part connecting a front end of the actuator portion with a lower end of the rotating lever portion, and the hinge portion comprises a groove formed perpendicularly to a rotation direction of the rotating lever portion.

BRIEF DESCRIPTION OF THE DRAWINGS

The invention will be explained in more detail in conjunction with appended drawings, wherein:

FIG. 1 is a perspective view showing an optical transceiver in a preferred embodiment of the invention;

FIG. 2 is an enlarged perspective view showing integration parts for the optical transceiver of embodiment;

DESCRIPTION OF THE PREFERRED EMBODIMENTS

A preferred embodiment of the present invention will be described in detail hereinbelow by referring to the accompanying drawings.

FIG. 1 shows an appearance of an optical transceiver of the invention.

FIG. 2 shows an appearance of the most important integration parts in the invention.

Figure 3:
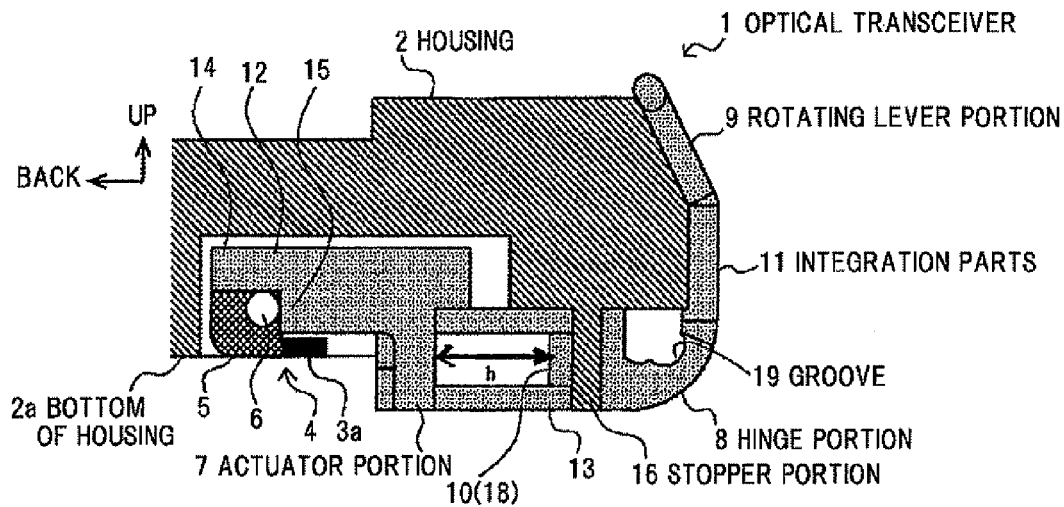
FIG. 3 is a cross sectional view showing an internal structure of the optical transceiver in FIG. 1 in locked state thereof.
Figure 4:
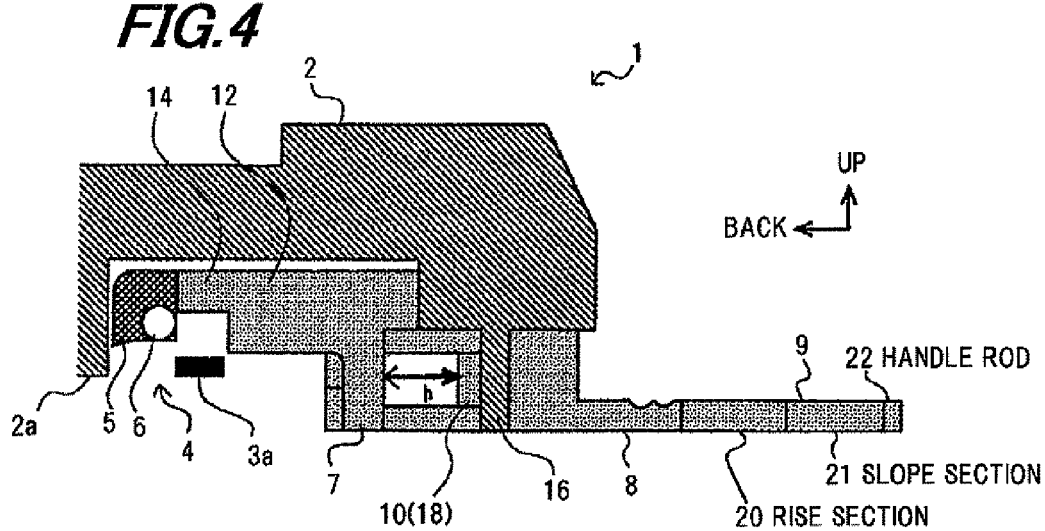
FIG. 4 is a cross sectional view showing an internal structure of the optical transceiver in FIG. 1 in unlocked state thereof.

FIGS. 3 and FIG. 4 show the positional relationship among a housing, the integration parts and a cage in the optical transceiver in locked state and unlocked state, respectively. Here, the optical parts and electrical parts for optical communication provided in the housing are omitted.

As shown in FIGS. 1 to 4, the optical transceiver 1 of the invention is composed of a housing 2 formed to be inserted into or extracted from a cage 3 provided in a host device (not shown), and a movable lock member 5 for restricting the extraction of the housing 2 from the cage 3. A lock hole 4 is provided in the cage 3 for restricting the extraction of the housing 2 from the cage 3 when the movable lock member 5 is put into the lock hole 4.

The optical transceiver 1 is further composed of, integrally formed of a resin material, (i) an actuator portion 7 engaged with the movable lock member 5 linked rotatably to a rotation shaft 6 secured to the housing 2 and formed such that it can be moved in front/back direction thereof (where the back direction corresponds to the left side in FIGS. 3 and 4) in the housing 2 for putting the movable lock member 5 into the lock hole 4 when it is moved backward and for releasing the movable lock member 5 from the lock hole 4 when it is moved forward, (ii) a rotating lever portion 9 connected to the actuator portion 7 via a hinge portion 8, formed rotatably from the upper front end of the housing 2 to the forward direction along with the development of the hinge portion 8, and serving as a handle for moving the actuator portion 7 in the forward direction when rotated forward, and (iii) a spring portion 10, which is attached to an outer frame portion 13 of the actuator portion 7, to be energized when the actuator portion 7 is moved forward and to be de-energized to move the actuator portion 7 backward.

Herein, the combination of the actuator portion 7, the rotating lever portion 9, and the spring portion 10 which are integrally formed of a resin material, is called 'integration parts 11'. In the integration parts 11 the actuator portion 7 includes a central bar section 12 and the outer frame section 13.

The central bar section 12 is, in the front/back direction, located inside of the housing 2 where it is enclosed in the cage 3, in the right/left direction located at the center when viewed from the front side, and in the up/down direction located just above a bottom 2a of the housing 2.

The rotating shaft 6 is fixed to the housing 2, and the movable lock member 5 is rotatably attached to the rotating shaft 6.

The central bar section 12 has a protrusion 14 to be engaged with the movable lock member 5, and a step portion 15 serving as a stopper after the protrusion 14 climbs over the rotating shaft 6 attached to the movable lock member 5. When the protrusion 14 climbs over the rotating shaft 6 and the step portion 15 is placed against the rotating shaft 6, the movable lock member 5 can be rotated to a position under the rotating shaft 6 by being pushed by the protrusion 14. On the other hand, when the protrusion 14 returns to a position where the protrusion 14 does not climb over the rotating shaft 6, the movable lock member 5 is made freely rotatable and the movable lock member 5 can be rotated by being pulled by the housing 2 to a position where it is aligned with the rotating shaft 6.

The outer frame section 13 is, in the front/back direction, located at a position of the housing 2 where it is not enclosed in the cage 3, and in the up/down direction located below the bottom 2a of the housing 2. When viewed from the front side, the outer frame section 13 is a part lying between both ends of the housing 2 in the right/left direction, and, when viewed from the top, the outer frame section 13 is shaped like a frame with an opening inside thereof The central bar section 12 is located above a part of the outer frame section 13 on the back side and the center side in the right/left direction.

The spring portion 10 will be detailed below.

The spring portion 10 is formed inside the outer frame section 13. The housing 2 is provided with a stopper portion 16 opposite to a part of the actuator portion 7 on the front side. The spring portion 10 is formed with a leaf spring shaped like a circular arc (top view) such that a rising shape opposite to the stopper portion 16 is formed from a base portion 17 to a contact portion 18 where it is pressed against the stopper portion 16. The thickness, curved form and width h (at the contact portion 18) of the spring portion 10 are determined such that the spring portion 10 is elastically deformed by being restricted by the stopper portion 16 when the actuator portion 7 is moved forward.

The hinge portion 8 is formed with a thin part for connecting a front wall of the actuator portion 7 to a base part of the rotating lever portion 9. The hinge portion 8 has a groove (or concave portion) 19 formed perpendicularly to the rotation direction of the rotating lever portion 9. The hinge portion 8 corresponds to a fulcrum of the rotating lever 9, and the hinge portion 8 functions also as a spring for recovering the hinge portion 8 into an original shape thereof by itself.

The rotating lever portion 9 is composed of a rise section 20 and a slope section 21 for fitting rise and slope parts of the housing 2 at lower front end and upper front end, respectively, thereof. The rotating lever portion 9 is further composed of a handle rod 22 lying between the top ends of the right and left slope sections 21.

The integration parts 11 is a resin molded product prepared by injection molding or the like using a resin material. The resin material desirably has low Young's modulus and high yield stress.

For example, the resin material may be POM (polyacetal) resins, PEI (polyetherimide) resins, PPS polyphenylenesulfide) resins and the like. When the integration parts 11 formed of PPS resin (with 10.1 GPa Young's modulus and 84 Mpa yield stress) is applied to the optical transceiver 1, it is confirmed by a simulation experiment that the optical transceiver 1 can be 1000 times or more inserted into and extracted from the housing 2 (i.e., the rotating lever portion 9 can be 1000 times or more rotated by 90° around the hinge portion 8).

The locking and unlocking operations of the optical transceiver 1 of the invention will be described referring to FIGS. 3 and 4.

When the unlocking is not conducted by the rotating lever portion 9 as shown in FIG. 3, the hinge portion 8 is recovered into its original shape i.e., such that the rotating lever portion 9 lies along the shape of the front end of the housing 2. In this case, the spring portion 10 is de-energized and the width h of the contact portion 18 is in its natural length. The actuator portion 7 is moved backward and the movable lock member 5 is put into the lock hole 4 of the cage 3.

The cage 3 is fixedly disposed inside a panel of an optical communication device (not shown) as a host device. Thus, most rear part of the optical transceiver 1 is enclosed in the cage 3 and a front part thereof is protruded from the panel of the optical communication device. In this case, since the movable lock member 5 is put into the lock hole 4 of the cage 3, the housing 2 is engaged with the cage 3 so that the optical transceiver 1 cannot be extracted from the optical communication device.

In this situation, a back-end electric terminal of the optical transceiver 1 is electrically connected with an internal circuit of the optical communication device.

In order to extract the optical transceiver 1, the handle rod 22 of the rotating lever portion 9 is firstly rotated around the hinge portion 8 by fingers for pinching it (or by finger(s) put thereon). In this case, since the hinge portion 8 is thin in thickness and provided with the groove 19, the hinge portion 8 can be more remarkably deformed and developed than the other parts by force applied to the handle rod 22. Along with the development of the hinge portion 8, the rotating lever portion 9 is rotated from the upper front end to the forward direction.

According as the rotating lever portion 9 is rotated ahead of the front end of the housing 2, the direction of force applied to the handle rod 22 changes from downward into forward. Thus, since the rotating lever portion 9 is rotated ahead of the front end of the housing 2 and then pulled forward, the actuator portion 7 integrated with the rotating lever portion 9 is moved forward.

When the actuator portion 7 is further moved forward, the protrusion 14 becomes nowhere in contact with the movable lock member 5. Thus, no external force by the protrusion 14 acts thereon so that the movable lock member 5 enabled to be freely moved is pressed against a part 3a of the cage 3 by being pulled by the actuator portion 7 and rotated around the rotation shaft 6 to be released from the lock hole 4 and withdrawn into the housing 2. As a result, the housing 2 is released from the cage 3.

On the other hand, the contact portion 18 of the spring portion 10 as a part of the integration parts 11 is in contact with the stopper portion 16 as a part of the housing 2. For this reason, as shown in FIG. 4, the spring portion 10 is deformed and energized such that the width h of the press section 18 becomes shorter than the natural length according as the actuator portion 7 as a part of the integration parts 11 is moved forward during the movable lock member 5 is put in the lock hole 4.

Further, when the actuator portion 7 is moved forward to a position where the protrusion 14 is nowhere in contact with the movable lock member 5, the energized force is gone which has been caused by deformation of the spring portion 10 that a width h of the press section 18 is shorter than the natural length. Thus, the spring portion 10 is de-energized. However the movable lock member 5 has already moved ahead of the lock hole 4 of the cage 3, and the movable lock member 5 is restricted by the bottom of the cage 3 so that it does not project from the housing 2.

Since the housing 2 is unlocked, the optical transceiver 1 can be extracted from the optical communication device. Namely, by further pulling the holding rod 22, the integration parts 11 and the housing 2 can be moved forward.

When the optical transceiver 1 is completely extracted from the optical communication device and the force applied to the handle rod 22 is removed, the hinge portion 8 returns to the original position or shape.

When the force applied to the handle rod 22 is removed while the spring portion 10 is deformed and energized such that the width h of the press section 18 is shorter than the natural length, the actuator portion 7 is moved backward by the energized force of the spring portion 10. As a result, the external force of the protrusion 14 acts on the movable lock member 5 and the movable lock member 5 is rotated around the rotation shaft 6 to be engaged with the lock hole 4.

Next, in loading the optical transceiver 1 into the optical communication device, while keeping the movable lock member 5 in the lock hole 4, the housing 2 is pushed into the cage 3 through the integration parts 11 in the original shape (not deformed). While the movable lock member 5 is inserted into the lock hole 4, the movable lock member 5 once hits against a cage 3a (which is shown as a part of the cage 3 in FIGS. 3 and 4), but the cage 3a is pressed and expanded downward by the movable lock member 5 so that the movable lock member 5 climbs over the part of cage 3a and is then put into the lock hole 4. Namely, the housing 2 can be engaged with the cage 3 as shown in FIG. 3. Thus, the electric terminal of the optical transceiver 1 is electrically connected to the inner circuit of the optical communication device.

As described in the above embodiment, the actuator portion 7, the rotating lever portion 9, and the spring portion 10 are integrated as the integration parts 11, which is integrally formed of the resin material. Hence, the number of parts can be less than that of the conventional lock mechanism which is composed by assembling the many separate members. For example, the conventional lock mechanism requires eight parts, i.e., the movable lock member, the actuator, the two rotating levers, the rotating lever pin, the two coil springs, and the identification color attachment. In contrast, the lock mechanism of the embodiment of the invention can be composed of only the two parts, i.e., the movable lock member 5 and the integration parts 11, so that the process for assembling the parts can be simplified. Thus, the embodiment of the invention contributes to reduction in number of parts and number of assembly steps.

In the embodiment of the invention, the structure of the integration parts 11 is simplified so that the manufacturing cost of the integration parts 11 can be reduced. In contrast, the conventional lock mechanism is provided with the coil spring retained between the actuator and the housing which require a mechanism for locking the coil spring so as not to disengage the coil spring. In the embodiment of the invention, the spring portion 10 is formed as a part of the integration parts 11 so that the structure of the lock mechanism can be thus simplified.

In the embodiment of the invention, since the integration parts 11 is formed of a resin, it can include pigments to be desirably colored. Thereby, the type or specification of the optical transceiver can be visually identified according to the color. Thus, the identification color attachment or additional coating as in the prior art is not necessary.

In the embodiment of the invention, since the integration parts 11 is formed of the resin, the spring characteristic of the elastic member (i.e., the spring portion 10 and the hinge portion 8) may be better than that of the prior art.

In the embodiment of the invention, since the rotating lever portion 9 is connected through the hinge portion 8 to the actuator portion 7, the rotating lever portion 9 can be rotated more smoothly than that of the prior art. Furthermore, it is possible to prevent a part of the members of the lock mechanism from contacting the housing 2.

Other embodiments of the invention will be described below.

Figure 5A:
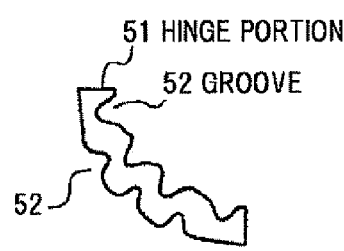
FIG. 5A is a side view showing a hinge portion of the integration parts.
Figure 5B:
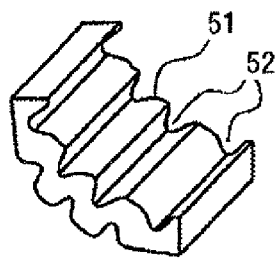
FIG. 5B is a perspective view showing the hinge portion in FIG. 5A.

In one embodiment, as shown in FIGS. 5A and 5B, a hinge portion 51 with plural grooves 52 may be used. In this example, four grooves 52 are provided on the inside curve of the hinge portion 51, and three grooves 52 are formed on the outside curve thereof. Thus, by increasing the number of the grooves 52, durability against the bending and stretching of the hinge portion 51 can be enhanced.

The principle will be explained below referring to FIGS. 6A to 6D.

Figure 6A:
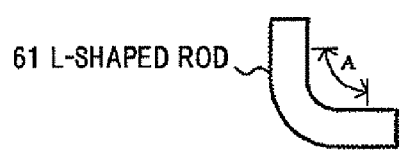
FIGS. 6A to 6D are side views showing bending/stretching of a resin L-shaped rod in another preferred embodiment of the invention.

In a resin L-shaped rod 61 which is formed into a substantially L-shape as shown in FIG. 6A, the surface distance (i.e., distance measured along the surface) between two points on the inside curve is defined to be A. When the resin L-shaped rod 61 is stretched straight as shown in FIG. 6B, the surface distance between the two points is A+ΔA. Thus, the ΔA corresponds to an elongation amount of the inside surface.

Figure 6C:
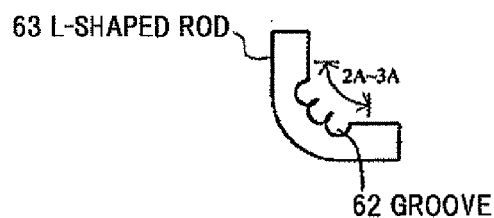
Figure 6B:
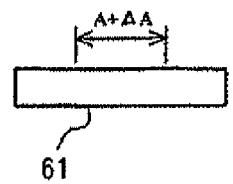
Figure 6D:
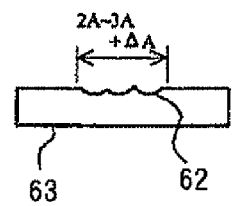

Next, as shown in FIG. 6C, in case of a resin L-shaped rod 63 with grooves 62 formed on the inside curve, the surface distance between the two points as above is increased to nearly a value between 2A to 3A. When the resin L-shaped rod 63 with the grooves 62 formed as above is stretched straight as shown in FIG. 6D, the elongation amount of the surface is still ΔA. In total, the surface distance between the two points is (2A to 3A)+ΔA. Comparing the rate of elongation between the two cases, the former is ΔA/A and the latter ΔA/(2A to 3A). Thus, the resin L-shaped rod 63 with the grooves 62 is in elongation rate lower than the resin L-shaped rod 61 without grooves. Therefore, fatigue of the resin L-shaped rod 63 caused by the bending and stretching can be reduced relatively, so that durability against the bending and stretching of the resin L-shaped rod 63 can be enhanced.

On the other hand, in case of grooves formed on the outside curve of a resin L-shaped rod, a compression rate of the outside surface during the bending and stretching is reduced by the same principle, so that durability against the bending and stretching of the resin L-shaped rod can be also enhanced.

Figure 7A:
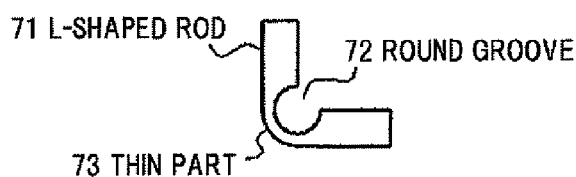
FIGS. 7A and 7B are side views showing a resin L-shaped rod with a groove in another preferred embodiment of the invention.

In a further embodiment, as shown in FIG. 7A, a round groove 72 may be formed on the inside curve of a resin substantially L-shaped rod 71 to have a thin part 73 thereon. Since the in part 73 is in thickness smaller than the other part, the thin part 73 can be more significantly deformed than the other part when bending force is applied to both ends of the resin L-shaped rod 71. This structure is suitable for the case that one side of the resin L-shaped rod 71 is rotated and recovered elastically, i.e., for use as a hinge.

Figure 7B:
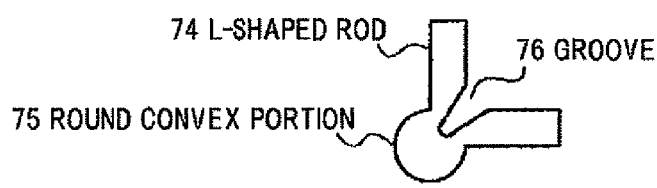

In a filter embodiment, as shown in FIG. 7B, a round convex portion 75 may be formed on the outside curve of a resin L-shaped rod 74, and concurrently a groove (concave) 76 may be formed deeper on the inside curve thereof to have an increased surface area. Therefore, stress generated during the bending and stretching of the resin L-shaped rod 74 can be dispersed so that durability against the bending and stretching can be enhanced. As shown in FIGS. 5A and 5B, the hinge portion 51 with the grooves formed alternately on both surfaces thereof also can have the same effect as this structure.

The hinge portion 51 in FIGS. 5A and 5B can have all of the features as shown in FIG. 6C, FIG. 7A and FIG. 7B, and is suitable for use as the hinge portion 8.

Figure 8A:
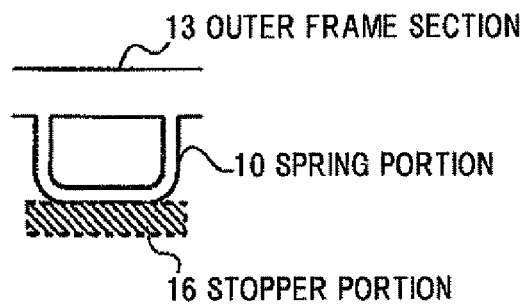
FIGS. 8A, 8B, and 8C are top views showing a spring portion of the integration parts in another preferred embodiment of the invention.
Figure 8B:
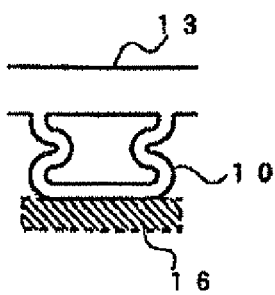
Figure 8C:
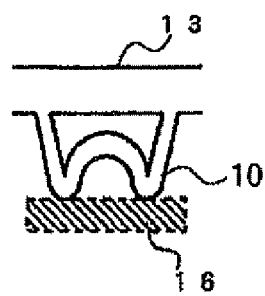
Figure 9:
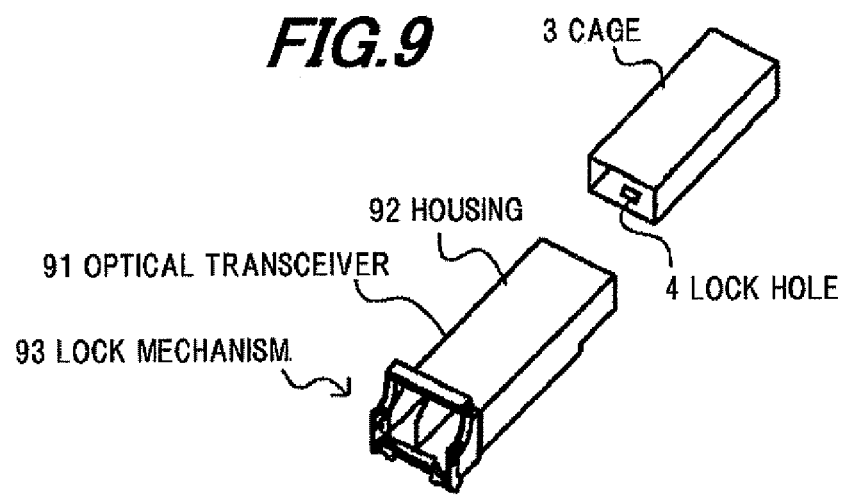
FIG. 9 is a perspective view showing the conventional optical transceiver.
Figure 10:
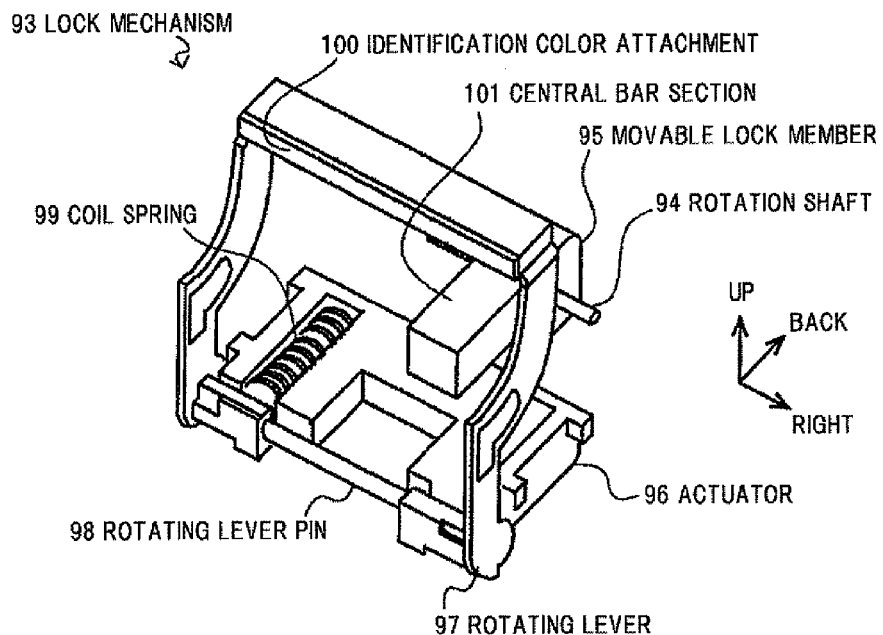
FIG. 10 is an enlarged perspective view showing the lock mechanism of the conventional optical transceiver.
Figure 11:
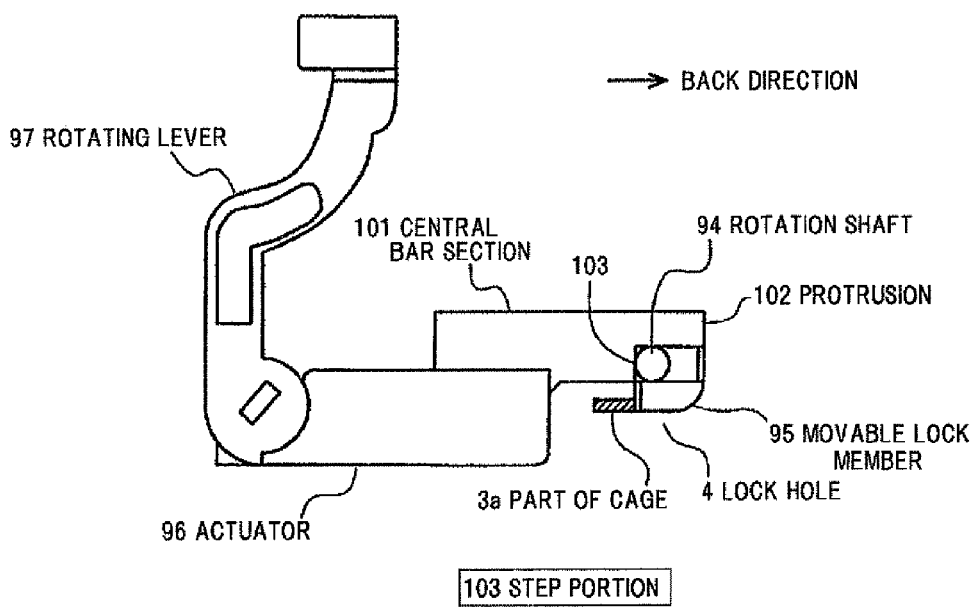
FIG. 11 is a schematic side view showing the conventional optical transceiver in locked state thereof.
Figure 12:
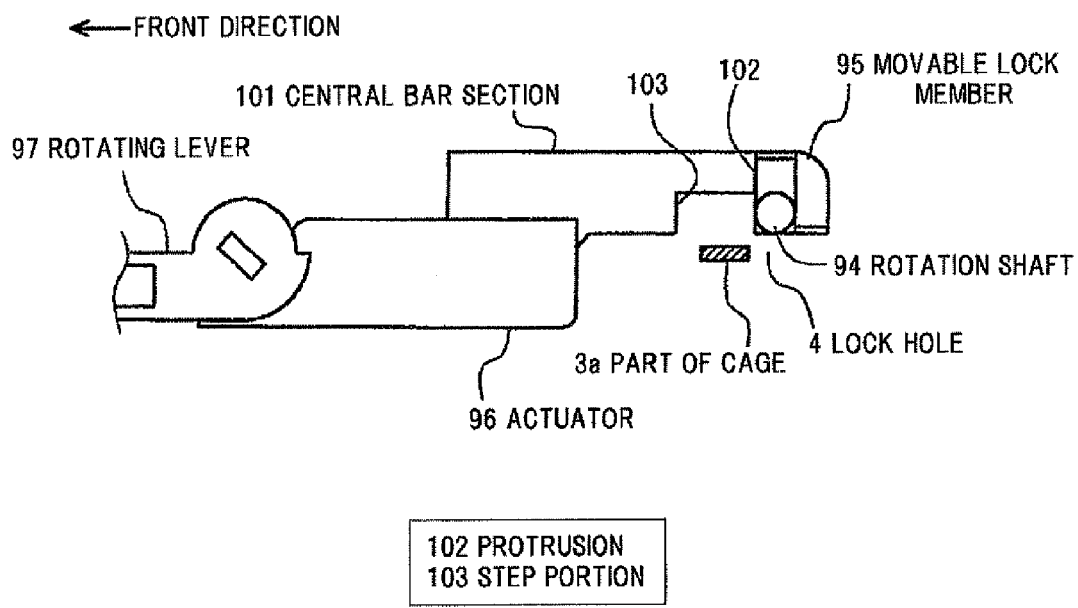
FIG. 12 is a schematic side view showing the conventional optical transceiver in unlocked state thereof.

Although in the above embodiment the spring portion 10 is shaped like a circular arc (top view), it may be U-shaped, 8-shaped or W-shaped as shown in FIGS. 8A to 8C, respectively.

Although as shown in FIG. 2 the hinge portion 8 is separately formed at three positions, i.e., the right end, center and left end, in the width direction of the integration parts 11, it may be separately formed at two or more than three positions in the width direction, or all over the width direction without being separately formed.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transceiver, comprising:
a housing formed to be inserted into or extracted from a cage in a host device;
optical parts and electrical parts for optical communication being housed in the housing;
a movable lock member for preventing the housing from being extracted from the cage, the cage comprising a lock hole for preventing the housing from being extracted from the cage when the movable lock member is placed into the lock hole; and
a plurality of integration parts, comprising:
an actuator portion engaged with the movable lock member rotatably connected to a rotation shaft attached to the housing, arranged movably in a front/back direction thereof in the housing, arranged to place the movable lock member into the lock hole when moved backward, and arranged to release the movable lock member from the lock hole when moved forward; and
a rotating lever portion connected to the actuator portion through a hinge portion, arranged rotatably from an upper front end of the housing to an open position along with development of the hinge portion, and comprising a handle for moving the actuator portion to a forward position when rotated into the open position, wherein the actuator portion and the rotating lever portion of the integration parts are integrally formed.

2. The optical transceiver according to claim 1, wherein:
the integration parts further comprises a spring portion that is connected to the actuator portion, energized when the actuator portion is moved forward, and moves the actuator portion backward when the spring portion is de-energized.

3. The optical transceiver according to claim 2, wherein:
the spring portion comprises a leaf spring comprising a rising shape that is formed opposite to a stopper portion formed on the housing, the rising shape comprising a base portion where it is connected to the actuator portion and a contact portion where it is pressed against the stopper portion, the rising shape being elastically deformed when the actuator portion is moved forward.

4. The optical transceiver according to claim 1, wherein:
the integration parts comprises a resin molded product.

5. An optical transceiver comprising:
a housing formed to be inserted into or extracted from a cage in a host device;
optical parts and electrical parts for optical communication being housed in the housing;
a movable lock member for preventing the housing from being extracted from the cage, the cage comprising a lock hole for preventing the housing from being extracted from the cage when the movable lock member is placed into the lock hole; and
a plurality of integration parts, comprising:
an actuator portion engaged with the movable lock member rotatably connected to a rotation shaft attached to the housing, arranged movably in a front/back direction thereof in the housing, arranged to place the movable lock member into the lock hole when moved backward, and arranged to release the movable lock member from the lock hole when moved forward; and
a rotating lever portion connected to the actuator portion through a hinge portion, arranged rotatably from an upper front end of the housing to an open position along with development of the hinge portion, and comprising a handle for moving the actuator portion to a forward position when rotated into the open position, wherein the actuator portion and the rotating lever portion of the integration parts are integrally formed, the hinge portion comprises a thin part connecting a front end of the actuator portion with a lower end of the rotating lever portion, and the hinge portion comprises a groove formed perpendicularly to a rotation direction of the rotating lever portion.

6. A method for connecting an optical transceiver module, comprising:
providing a housing for insertion into or extraction from a cage in a host device;
housing optical parts and electrical parts for optical communication in the housing;
preventing the housing from being extracted from the cage using a movable lock member;
preventing the housing from being extracted from the cage when the movable lock member is placed into a lock hole in the cage; and
providing an actuator portion engaged with the movable lock member rotatably connected to a rotation shaft attached to the housing, arranged movably in a front/back direction thereof in the housing;
engaging the movable lock member with the lock hole when the actuator portion is moved backward;
disengaging the moveable lock member from the lock hole when the actuator portion is moved forward;
providing a rotating lever portion connected to the actuator portion through a hinge portion, arranged rotatably from an upper front end of the housing to an open position along with development of the hinge portion, the rotating lever portion comprising a handle;
moving the actuator portion to a forward position using the handle when the lever portion is rotated into the open position; and
moving the actuator portion to a backward position using the handle before the lever portion is rotated into a closed position.

* * * * *